United States Patent
Tu et al.

(10) Patent No.: US 8,254,858 B2
(45) Date of Patent: Aug. 28, 2012

(54) TECHNIQUES TO MANAGE POWER BASED ON MOTION DETECTION

(75) Inventors: Jerome C. Tu, Saratoga, CA (US); Foster Curry, Berkeley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1231 days.

(21) Appl. No.: 11/962,798

(22) Filed: Dec. 21, 2007

(65) Prior Publication Data

US 2009/0164813 A1  Jun. 25, 2009

(51) Int. Cl.
 *H01Q 11/12* (2006.01)
(52) U.S. Cl. ............... 455/127.5; 455/343.2; 455/456.1; 455/423; 455/574; 455/414.1; 370/311; 370/328
(58) Field of Classification Search ............... 455/127.5, 455/343.1, 456.1, 343.2, 423, 230, 414.1, 455/574; 370/311, 328
See application file for complete search history.

(56) References Cited

U.S. PATENT DOCUMENTS

| 2006/0119508 A1* | 6/2006 | Miller ................. 342/357.17 |
| 2008/0161072 A1* | 7/2008 | Lide et al. ................. 455/574 |
| 2008/0285494 A1* | 11/2008 | Shin ................. 370/311 |
| 2009/0143050 A1* | 6/2009 | Ignatin ................. 455/414.1 |

* cited by examiner

Primary Examiner — Amancio Gonzalez

(57) ABSTRACT

Techniques to manage power based on motion detection are described. For example, a mobile computing device may include a radio module having a communications failure event detector operative to detect a communications failure event, a motion detector operative to detect motion, and a processor coupled to the radio module and the motion detector. The processor operative to execute a scan control module to determine the mobile computing device is moving or stationary, and control scanning operations by the radio module in accordance with the determination. Other embodiments are described and claimed.

17 Claims, 5 Drawing Sheets

200

- DETECT A COMMUNICATIONS FAILURE EVENT
  202
- DETERMINE A MOBILE COMPUTING DEVICE IS MOVING OR STATIONARY
  204
- CONTROL SCANNING OPERATIONS FOR RADIO SIGNALS BY A RADIO IN ACCORDANCE WITH THE DETERMINATION
  206

*FIG. 2*

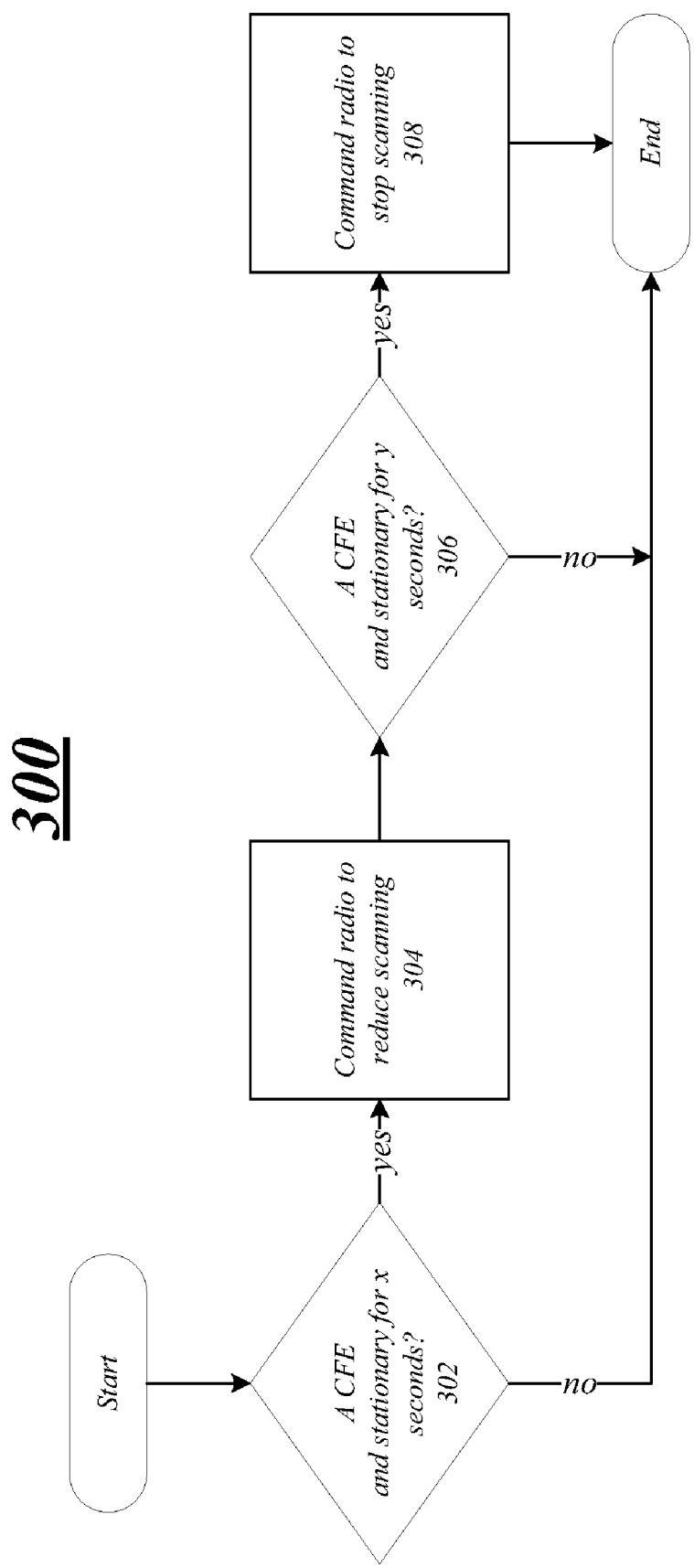

TECHNIQUES TO MANAGE POWER BASED ON MOTION DETECTION

BACKGROUND

Mobile computing devices, such as smart phones, may provide various processing capabilities. For example, mobile devices may provide personal digital assistant (PDA) features, including word processing, spreadsheets, synchronization of information (e.g., e-mail) with a desktop computer, and so forth.

In addition, such devices may have wireless communications capabilities. More particularly, mobile devices may employ various communications technologies to provide features, such as mobile telephony, mobile e-mail access, web browsing, and content (e.g., video and radio) reception. Exemplary wireless communications technologies include cellular, satellite, and mobile data networking technologies.

Providing both processing and communications capabilities in a single device produces exceptional power management issues for smart phones, particularly as form factors for smart phones continue to decrease. As a result, battery life for a smart phone may be substantially shortened. This may force frequent recharging operations, thereby impairing the convenience of such devices. Consequently, improved power management techniques are desired.

BRIEF DESCRIPTION OF THE DRAWINGS

FIG. 2 illustrates one embodiment of first logic diagram.

FIG. 3A illustrates one embodiment of a second logic diagram.

DETAILED DESCRIPTION

Figure 1:
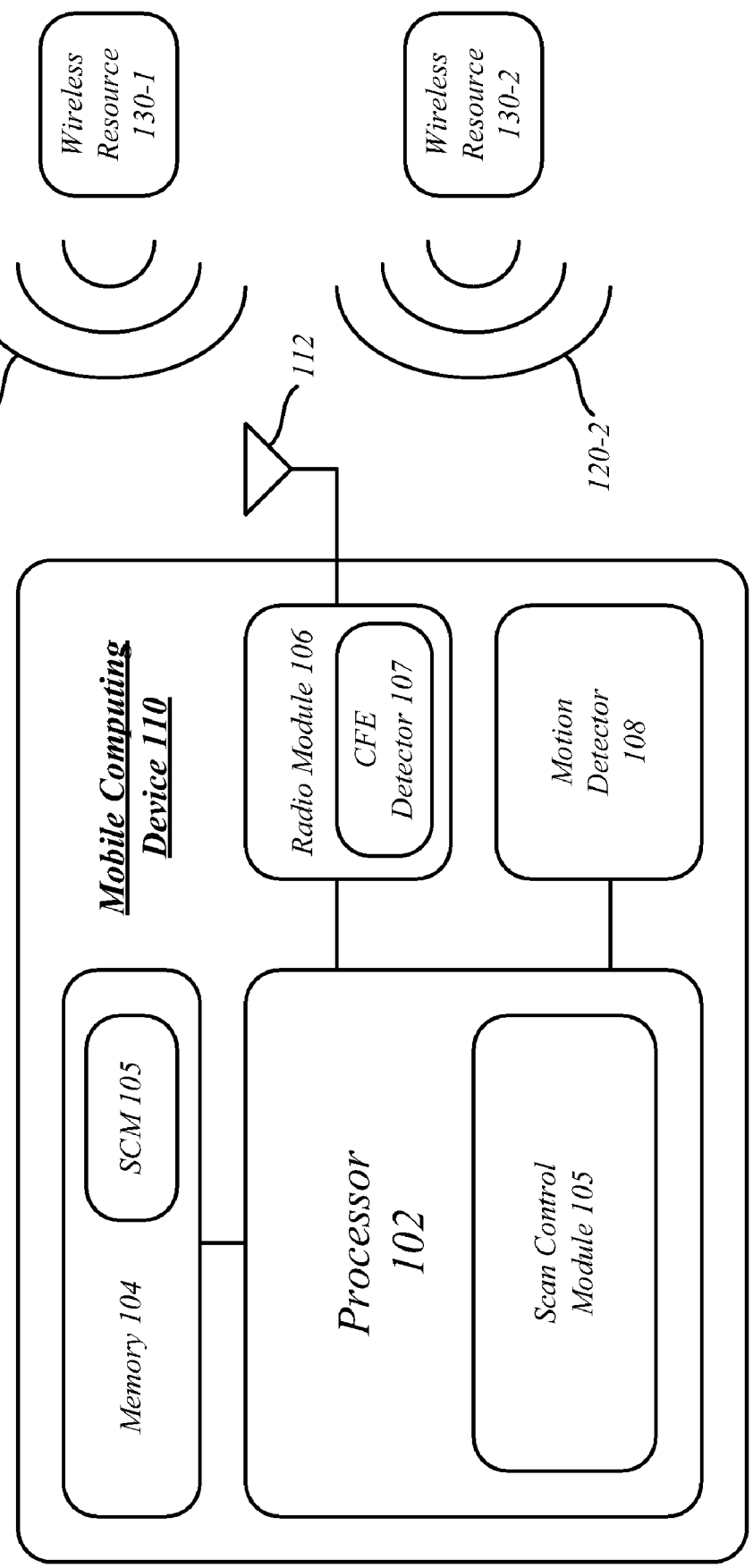
FIG. 1 illustrates one embodiment of a communications system.

Various embodiments may be generally directed to power management techniques for a mobile computing device, such as a smart phone. Some embodiments may be particularly directed to power management techniques for a mobile computing device based on detected motion for the mobile computing device.

In one embodiment, for example, a mobile computing device may include a radio module arranged to provide voice communications capabilities and/or data communications capabilities for the mobile computing device. The radio module may include a communications failure event detector operative to detect a communications failure event for the radio module. One example of a communications failure event may include without limitation when a radio module detects that a received signal strength indication (RSSI) for one or more radio signals are below a certain threshold value. The mobile computing device may also include a motion detector operative to detect motion for the mobile computing device. The mobile computing device may further include a processor coupled to the radio module and the motion detector. The processor may be operative to execute a scan control module to determine whether the mobile computing device is moving or stationary. This may be accomplished, for example, by receiving an appropriate signal from the motion detector. The scan control module may control scanning operations performed by the radio module in accordance with the movement determination. For example, the scan control module may send control directives to reduce or suspend scanning operations when the mobile computing device is stationary, and initiate or resume scanning operations when the mobile computing device is moving. Other embodiments are described and claimed.

Controlling scanning operations based on movement of the mobile computing device may provide several advantages. For example, a radio module typically scans for radio signals on a continuous or periodic basis for a number of different reasons, such as to receive telephone calls, initiate telephone calls, improve call quality, perform hand-off operations, and so forth. Such scanning operations draw a significant amount of power from a power supply (e.g., a battery) for the mobile computing device. The power supply has limited amounts of power, and efficient use of the power supply provides various operational advantages. The radio module, however, typically performs scanning operations regardless of whether there are any wireless resources within communication range, which unnecessarily draws power from the power supply. This condition is particularly unnecessary whenever the mobile computing device is stationary in an area with little or no wireless coverage, since there is little likelihood of the radio module entering an area with any active radio signals. This may unnecessarily draw power from the power supply, thereby reducing battery life.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include other combinations of elements in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates one embodiment of an apparatus that may communicate across different types of wireless links. In particular, FIG. 1 shows a communications system 100 comprising various representative elements, including a mobile computing device 110 capable of communicating via radio signals 120-1-m with one or more wireless resources 130-1-n. The mobile computing device 110 may include by way of example and not limitation a processor 102, a memory 104, a scan control module 105, a radio module 106, a motion detector 108, and an antenna 112. The radio module 106 may further include a communications failure event (CFE) detector 107. These elements or portions of these elements may be implemented in hardware, software, firmware, or in any combination thereof. The embodiments are not limited to these depicted elements.

The mobile computing device 110 may be generally configured to support or provide cellular voice communication, wireless data communication and computing capabilities. The mobile computing device 110 may be implemented as a combination handheld computer and mobile telephone, sometimes referred to as a smart phone. Examples of smart phones include, for example, Palm® products such as Palm® Treo™ smart phones. Although some embodiments may be described with the mobile computing device 110 implemented as a smart phone by way of example, it may be appreciated that the embodiments are not limited in this context. For example, the mobile computing device 110 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 4.

The processor 102 may comprise a general purpose processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, e-mail, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 104 may comprise computer-readable media such as volatile or non-volatile memory units arranged to store programs and data for execution by the processor 102. As depicted in FIG. 1, the memory 104 may store a scan control module 105 in the form of executable program instructions, code or data. The processor 102 may retrieve and execute the program instructions, code or data from the memory 104 to control or provide scanning operations for the mobile computing device 110. Although the scan control module 105 is shown as part of the memory 104 for execution by the processor 102, it may be appreciated that the scan control module 105 may be stored and executed by other memory and processing resources available to the mobile computing device 110, such as a radio processor and accompanying memory implemented by the radio module 106. Further, although the scan control module 105 is depicted as software executed by a processor, it may be appreciated that the operations for the scan control module 105 may be implemented in hardware as well using one or more integrated circuits, for example. The embodiments are not limited in this context.

The radio module 106 may comprise various radio elements, including a radio processor, one or more transceivers, amplifiers, filters, switches, and so forth. The radio module 106 may communicate with remote devices across different types of wireless links utilizing various communications techniques. For example, the radio module 106 may communicate across wireless links provided by one or more cellular radiotelephone systems. Examples of cellular radiotelephone systems may include Code Division Multiple Access (CDMA) systems, GSM systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. The radio module 106 (or a second radio module) may also communicate across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. The embodiments, however, are not limited to these examples.

The radio module 106 may additionally or alternatively communicate across various non-cellular communications links. The radio module 106 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile computing device 400 may also utilize different types of shorter range wireless systems, such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

It may be appreciated that the radio module 106 may utilize different communications elements (e.g., radio processors, transceivers, etc.) to implement different communications techniques. Furthermore, the radio module 106 may support multiple communications techniques by implementing multiple sets of corresponding radio equipment. For example, the radio module 106 may support GSM communications using a first transceiver, IEEE 802.xx (e.g., 802.11) communications using a second transceiver, Bluetooth communications using a third transceiver, and so forth. The embodiments are not limited in this context.

The radio module 106 may be arranged to periodically or continuously scan wireless shared media, such as one or more portions of the radio-frequency (RF) spectrum, for the various radios implemented by the radio module 106. The radio module 106 may implement a scanning algorithm to perform various scanning operations for radio energy. Radio energy may refer to RF energy used by a radio or wireless transceiver for communicating information, rather than spurious energy received from various electronic devices, such as a microwave, monitor, television, and so forth. For example, the radio module 106 may measure a received radio signal strength, received signal strength (RSS) or received signal strength indication (RSSI) from nearby wireless resources (collectively referred to herein as "RSSI"). An RSSI is typically a measurement of the power present in a received radio signal in arbitrary units. The RSSI may provide an indication of how much information may be communicated between devices. Typically a lower RSSI implies lower information rates or quality, while a higher RSSI implies higher information rates or quality.

The scanning operations may include scanning for radio energy of a given RSSI in the appropriate bands or sub-bands of the RF spectrum allocated to the one or more transceivers or radios implemented by the radio module 106. For example, the radio module 106 may scan for various radio signals **120-1-*m* received from various wireless resources 130-1-*n*. The wireless resources 130-1-*n* may utilize a radio module implementing the same or similar communication techniques as implemented for the radio module 106. The radio module 106 may perform the scanning operations using a scan list to scan various sets of frequencies. The radio module 106 may perform scanning operations for any number of reasons, such as establishing, managing or terminating a voice communication session or a data communication session, performing hand-off operations when the mobile computing device 110 is moving between wireless resources (e.g., 130-1, 130-2), switching communication channels for the same wireless resource (e.g., 130-1**) due to bandwidth or quality issues, and so forth.

The motion detector 108 may be arranged to detect motion or absence of motion for the mobile computing device 110. The motion detector 108 may comprise or be implemented using any particular motion detection device or technique, such as an accelerometer, a gyroscope, a global positioning system, a network enhanced global positioning system, a base station proximity system, a triangulation system, a time difference system, a camera, a proximity sensor, and so forth. The embodiments are not limited in this context.

In general operation, the mobile computing device 110 may provide various communications and computing resources for an operator or user. For example, the radio module 106 may be operative to continuously or periodically scan for radio signals from one or more wireless resources, such as the radio signals 120-1, 120-2 from the respective wireless resources 130-1, 130-2. The radio module 106 may perform such scanning operations in anticipation of the mobile computing device 110 initiating or receiving a voice communication (e.g., telephone call) or a data communication (e.g., text message, instant message). The radio module 106 may perform such scanning operations during a voice communication or data communication session as well, such as when anticipating a hand-off between different sets of cellular radiotelephone infrastructure equipment (e.g., base stations).

In some cases, the mobile computing device 110 may experience a communications failure event. In one embodiment, for example, the radio module 106 may include a CFE detector 107 arranged to monitor and detect for one or more types of communications failure events. A communications failure event may refer to any condition or event that prevents the mobile computing device 110 from not being capable of communicating with another device over a wireless channel. Some examples of a communications failure event may include without limitation a RSSI failure event, a timeout event, an acquisition failure event, a decoding error event, and so forth. A communications failure event may occur for any number of reasons, such as when the mobile computing device 110 does not have access to any wireless resources, is outside the effective communication range of the wireless resources **130-1-*n***, temporary or permanent equipment failure, significant radio interference (e.g., fading, multipath, signal attenuation, channel impairments, signal delay, signal phase shift, signal distortion, signal noise, etc.), and so forth. The specific number and type of defined communications failure events may vary according to a given implementation.

In one embodiment, for example, the radio module 106 may include a CFE detector 107 arranged to monitor and detect for a communications failure event such as a RSSI failure event. The RSSI failure event may comprise an event where an RSSI is below an RSSI threshold value. In one embodiment, the radio module 106 may be operative to detect when a RSSI for one or more of the radio signals **120-1-*m* as transmitted from the wireless resources 130-1-*n* are below a certain threshold value, such as an RSSI threshold value. For example, the radio module 106 may measure a RSSI from nearby wireless resources. When the RSSI is below a certain RSSI threshold value, the mobile computing device 110 may experience reduced communication capabilities, and in some cases, may be unable to communicate any information with the wireless resources 130-1-*n*. The latter case may sometimes be referred to as a "lost coverage" or a "no coverage" condition. When the radio module 106 detects the RSSI is below a certain RSSI threshold value, the radio module 106** may output a signal indicating a RSSI failure event has occurred.

It may be appreciated that the particular RSSI threshold value may vary as desired for a given implementation, depending on such factors as the type of information to communicate, the application communicating the information, the amount of information to communicate, the sensitivity of the radio module 106, whether one or more antennas are used, an antenna diversity technique, available power for the radio module 106, and so forth. The embodiments are not limited in this context.

In one embodiment, for example, the radio module 106 may include a CFE detector 107 arranged to monitor and detect for a communications failure event such as a timeout event. A timeout event may comprise an event where the radio module 106 does not receive one or more responses to transmitted requests within a defined time period. In one embodiment, the radio module 106 may implement one or more timers, or use existing timers, and begin timing operations whenever information is transmitted from the radio module 106 to another wireless device. The transmitted information could be limited to information that typically requires some form of response or acknowledgement from the receiving wireless device. Whenever the timers indicate that an expected response has not been received within the defined time period, the radio module 106 may output a signal indicating a timeout event has occurred.

In one embodiment, for example, the radio module 106 may include a CFE detector 107 arranged to monitor and detect for a communications failure event such as an acquisition failure event. An acquisition failure event may comprise an event where the radio module 106 does not acquire a communications channel (e.g., voice or data) within a defined time period. The radio module 106 may attempt to locate and acquire a voice communications channel and/or a data communications channel. Whenever the timers indicate that a communications channel has not been acquired within the defined time period, the radio module 106 may output a signal indicating an acquisition failure event has occurred.

In one embodiment, for example, the radio module 106 may include a CFE detector 107 arranged to monitor and detect for a communications failure event such as a decoding error event. A decoding error event may comprise an event where the radio module 106 is not capable of properly decoding information received from another wireless device, such as a beacon signal. This may occur for a number of reasons, such as channel impairments distorting the received signal so that it may not be decoded and recognized by the mobile computing device 110. Whenever the radio module 106 fails to decode information received from another wireless device, or fails to decode received information within a defined time period, the radio module 106 may output a signal indicating a decoding error event has occurred.

In cases where the mobile computing device 110 experiences a communications failure event, the mobile computing device 110 may still spend a significant amount of time in an active state or an idle state during which the radio module 106 continuously monitors the radio environment by scanning for wireless resources 130-1-$n$ that may be within range of the mobile computing device 110. For example, a user might leave the mobile computing device 110 in an idle state when at home to receive telephone calls or email messages. The radio module 106 may continuously scan various operating frequencies for the various transceivers implemented for the radio module 106, even though the radio environment is unlikely to change significantly when the mobile computing device 110 is stationary, or even when moving within the local confines of a residence or home. This consumes significant amounts of power from the power supply that has finite energy. This problem may be exacerbated whenever the mobile computing device 110 is in an area with weak coverage or no coverage, or located at a common boundary edge for two or more wireless resources 130-1-$n$. In the latter case, the radio module 106 may cycle through channel measurements for all the wireless resources 130-1-$n$ within communication range of the radio module 106, such as when attempting to determine whether a wireless resource has a stronger signal in anticipation of performing hand-off operations. Given the time interval a user typically sleeps, such scanning activity may cause the mobile computing device 110 to drain the battery completely by the time the user awakes.

To solve these and other problems, the scan control module 105 may control activities for one or more elements of the mobile computing device 110. This may involve sending one or more directives to the appropriate elements. To provide such control, the scan control module 105 may include various logic, routines and/or circuitry that operate on information received from other elements. In one embodiment, for example, the scan control module 105 may control operations of the radio module 106 based on inputs received from the radio module 106 and the motion detector 108. The scan control module 105 may output various control directives to the radio module 106 to control various scanning operations for the radio module 106 based on the received inputs. In embodiments, one or more processors may execute such logic and routines.

In some embodiments, one or more interfaces may employ various techniques to exchange information between the elements of the mobile computing device 110. For example, an interface may activate and/or detect activated signal lines. Such signal lines may be dedicated to particular signals. Alternatively, an interface may generate data messages to be transmitted across various connections. Exemplary connections may include a parallel interface, a serial interface, a bus interface, and/or a data network.

In various embodiments, the CFE detector 107 of the radio module 106 may be operative to detect a communications failure event. The communications failure event may comprise, for example, a RSSI failure event, a timeout event, an acquisition failure event, a decoding error event, or some other communications failure event. The CFE detector 107 may output an appropriate signal or message to the scan control module 105 indicating the communications failure event. The motion detector 108 may be operative to detect motion for the mobile computing device 110, and output an appropriate signal or message to the scan control module 105. When a communications failure event is detected, and the mobile computing device 110 is stationary, the scan control module 105 may issue a control directive to the radio module 106 to reduce or suspend scanning operations for the radio module 106. When the mobile computing device 110 is moving, the scan control module 105 may issue a control directive to the radio module 106 to initiate or resume scanning operations for the radio module 106. When the radio module 106 does not detect a communications failure event, the scan control module 105 may refrain from issuing any control directives and allow the radio module 106 to perform normal scanning operations regardless of whether the mobile computing device 110 is moving or stationary.

In one embodiment, the scan control module 105 may be operative to determine the mobile computing device 110 is stationary for a first time period, and issue a control directive to reduce a scan rate used by the radio module 106 for the scanning operations. The first time period may comprise a user configurable or default time period representing any desired time interval, such as x seconds. The first time period may be used to control sensitivity for the scan control module 105. The first time period could be set for a time interval that allows for ordinary and expected stationary periods for the mobile computing device 110, such as the duration of an average traffic signal for a traffic stop. This may avoid the scan control module 105 from repeatedly issuing control directives to reduce, suspend and resume scanning operations for normal operating environments, thereby causing the radio module 106 to continuously cycle through different operating modes that might unnecessarily consume power from the power supply for the mobile computing device 110. The exact value set for the first time period should balance power conservation goals with other design parameters, such as ensuring priority communications are received by the mobile computing device 110, and may vary with a given implementation. For example, if the user expects an important telephone call, the user may set the first time period for a longer period of time to increase the probability of receiving the incoming call.

Once the mobile computing device 110 is stationary for the first time period, the scan control module 105 may issue a control directive to reduce a scan rate used by the radio module 106 for the scanning operations. This may reduce power consumption from the power supply for the mobile computing device 110. The scan rate may represent how often the radio module 106 scans for the radio signals 120-1-$m$ within a given time period. For example, the radio module 106 may normally wake up from idle mode to active mode every 5 minutes, perform scanning operations for 1 minute, and revert to idle mode once scanning operations are completed without detecting any radio signals. The scan control module 105 may issue a control directive to reduce a scan rate and/or scan interval for the radio module 106, such as from 1 minute out of every 5 minutes to 30 seconds out of every 5 minutes, for example.

In one embodiment, the scan control module 105 may be operative to determine the mobile computing device 110 is stationary for a second time period, and issue a control directive to suspend or terminate scanning operations by the radio module 106. This may further reduce power consumption from the power supply for the mobile computing device 110. As with the first time period, the second time period may comprise a user configurable or default time period representing any desired time interval, such as y seconds. The second time period may be used to control sensitivity for the scan control module 105 beyond the first time period, thereby allowing different scanning modes based on stationary time intervals. The second time period may account for a time interval that safely assumes the mobile computing device 110 will remain stationary for sufficient time to justify the power saving features of suspending scanning operations of the radio module 106.

Once the radio module 106 suspends scanning operations, the scan control module 105 may issue a control directive to resume scanning operations based on different criteria. For example, the scan control module 105 may issue a suspend duration representing an amount of time the radio module 106 should not perform scanning operations, such as 8 hours. The scan control module 105 may set a timer for the suspend duration, and send a control directive to the radio module 106 to resume scanning operations based on the timer. This may be desirable if the motion detector 108 becomes inoperative or disabled. The scan control module 105 may periodically wake up the radio module 106 as a safety measure. In another example, the scan control module 106 may not issue a suspend duration, but rather allow the radio module 106 to remain suspended while the mobile computing device 110 remains stationary.

While the radio module 106 is suspended, the motion detector 108 may continue to monitor the mobile computing device 110 for any motion or movement. To enhance power conservation, the type and arrangement for the motion detector 108 should be selected to consume less energy than the radio module 106. When the motion detector 108 detects movement of the mobile computing device 110, the motion detector 108 may send a signal to the scan control module 105. The scan control module 105 may receive the signal from the motion detector 108, and send a control directive to the radio module 106 to resume scanning for radio signals when the mobile computing device is moving.

The scan control module 105 may control scanning operations for the radio module 106 in accordance with different types of movement of the mobile computing device 110. For example, the mobile computing device 110 may have movement patterns that are different when in a pocket or brief case while the operator is walking down the street versus driving in an automobile. Consequently, the scan control module 105 may have logic that resumes partial or full scanning operations based on the type of detected movement. This may be accomplished using one or more motion parameters to control sensitivity of the detected movement for the mobile computing device 110. Examples of various motion parameters may include without limitation a speed parameter, a velocity parameter, a direction parameter, an altitude parameter, and so forth.

In one embodiment, the scan control module 105 may use a speed parameter. Speed is a scalar quantity with dimensions of distance and time. Speed is the rate of motion, or equivalently the rate of change in position, many times expressed as distance d traveled per unit of time t. The scan control module 105 may be arranged to send a control directive to the radio module 106 to resume scanning for radio signals when the mobile computing device 110 is moving at a measured speed above a threshold value speed. The speed parameter may be used to reflect the assumption that the radio module 106 should not resume partial or full scanning operations until the mobile computing device 110 moves at a speed equal to or greater than the average walking speed for a pedestrian, the average driving speed for a driver, and so forth. This may prevent the scan control module 105 to issue a resume scanning signal for the radio module 106 whenever the mobile computing device 110 has spurious movement, such as when bumped on a night stand or when moved from one side of a room to another side of the same room. Rather, the movement should be of the type that would increase the probability that the mobile computing device 110 may actually move within range of one or more of the wireless resources 130-1-n.

In one embodiment, the scan control module 105 may use a velocity parameter. Velocity is a vector quantity with dimensions of speed and direction. Velocity is defined as the rate of change of position. It is a vector physical quantity, and therefore both speed and direction are required to define it. The scan control module 105 may be arranged to send a control directive to the radio module 106 to resume scanning for radio signals when the mobile computing device 110 is moving at a measured velocity above a threshold value velocity. The velocity parameter may be used to reflect the assumption that the radio module 106 should not resume partial or full scanning operations until the mobile computing device moves at a velocity equal to or greater than the average velocity achieved while walking or driving. This may prevent the scan control module 105 to issue a resume scanning signal for the radio module 106 whenever the mobile computing device 110 has movement that might reach a minimum threshold value for a speed parameter but always returns to the original position, such as the up-and-down movement of when an operator is walking on a treadmill, stair climber, elliptical trainer, or some other exercise equipment.

The quality of the movement of the mobile computing device 110 may also be augmented or enhanced using other elements implemented with the mobile computing device 110. For example, the mobile computing device may include a separate GPS device (not shown separately). The motion detector 108 may be used to determine movement of the mobile computing device 110, while the GPS device may be used to determine location for the mobile computing device 110. The scan control module 105 may be arranged to issue a control directive to the radio module 106 to resume partial or full scanning operations based on the movement and location of the mobile computing device 110. This may reflect the assumption that movement within a structure such as a house or office does not merit resuming scanning operations, while movement outside of the house does merit resuming scanning operations. Alternatively, the granularity of the location information may be increased to a level to detect movement within a house or office. This may reflect the assumption that movement within a structure may affect the detected communications failure event (e.g., detected RSSI), such as inter-room or intra-room movement, and therefore sensitivity of the scan control module 105 and the motion detector 108 may be modified accordingly.

Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element, a software element executed by a processor, or any combination thereof. The embodiments are not limited in this context.

FIG. 2 illustrates one embodiment of a logic diagram. In particular, FIG. 2 illustrates a logic diagram 200, which may be representative of the operations executed by one or more embodiments described herein. As shown in the FIG. 2, the logic diagram 200 may detect a communications failure event at block 202. The logic diagram 200 may determine a mobile computing device is moving or stationary at block 204. The logic diagram 200 may control scanning operations for radio signals by a radio in accordance with the determination at block 206. The embodiments are not limited in this context.

In one embodiment, the logic diagram 200 may detect a communications failure event at block 202. For example, the CFE detector 107 of the radio module 106 may continuously or periodically scan the radio signals 120-1, 120-2 received from the wireless resources 130-1, 130-2. If one or both of the radio signals 120-1, 120-2 fall below a certain RSSI, then the radio module 106 may output a signal to the scan control module 105 indicating a RSSI failure event. Similarly, the radio module 106 may be tuned to detect other communications failure events as previously described.

In one embodiment, the logic diagram 200 may determine a mobile computing device is moving or stationary at block 204. For example, the motion detector 108 may continuously or periodically monitor the mobile computing device 110 to detect any movement. When movement is detected, the motion detector 108 may output a signal to the scan control module 105 indicating the movement. Additionally or alternatively, the motion detector 108 may output a motion parameter for the movement as well.

In one embodiment, the logic diagram 200 may control scanning operations for radio signals by a radio in accordance with the determination at block 206. For example, the scan control module 105 may receive the signals from the radio module 106 and/or the motion detector 108, and issue various control directives to the radio module 106 to control scanning operations for the radio module 106. The control directives may include by way of example and not limitation control directives for reducing a scan rate used by the radio module 106 for the scanning operations, suspending scanning operations by the radio module 106 while the mobile computing device 110 remains stationary, scanning for radio signals 120-1-$m$ when the mobile computing device 110 is moving, scanning for radio signals 120-1-$m$ when the mobile computing device 110 is moving at a measured speed above a threshold value speed, scanning for radio signals 120-1-$m$ when the mobile computing device 110 is moving at a measured velocity above a threshold value velocity, and so forth. The embodiments are not limited in this context.

FIG. 3A illustrates one embodiment of a logic diagram 300. The logic diagram 300 may provide an exemplary implementation for reducing or suspending scanning operations for the radio module 106. As shown in FIG. 3A, the logic diagram 300 may determine whether the radio module 106 experiences a communications failure event for a first time period of x seconds at diamond 302. If the radio module 106 does not experience a communications failure event for a first time period of x seconds at diamond 302, then the logic diagram 300 ends. If the radio module 106 does experience a communications failure event for a first time period of x seconds at diamond 302, however, then the logic diagram 300 commands the radio module 106 to reduce scanning operations at block 304. Continuing with the logic path, the logic diagram 300 then determines whether the radio module 106 experiences a communications failure event for a second period of y seconds at diamond 306. If the radio module 106 does not experience a communications failure event for a second period of y seconds at diamond 306, then the logic diagram 300 ends. If the radio module 106 experiences a communications failure event for a second period of y seconds at diamond 306, however, then the logic diagram 300 commands the radio module 106 to suspend, terminate or stop scanning operations at block 308.

Figure 3B:
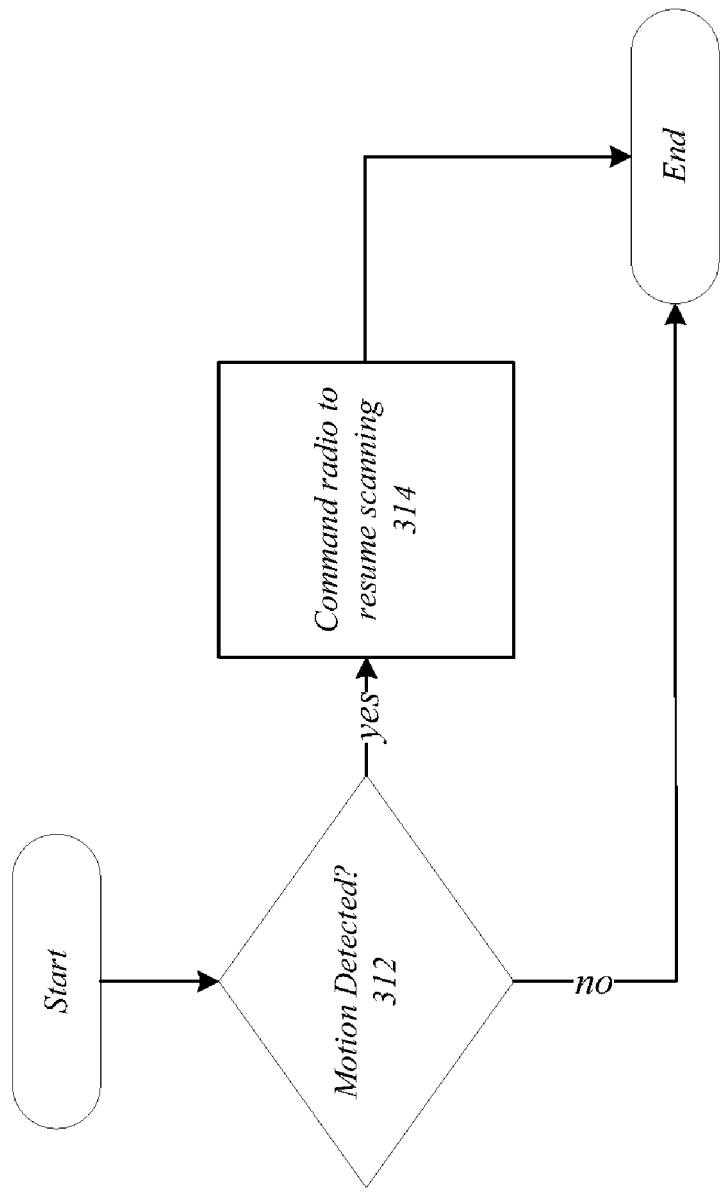
FIG. 3B illustrates one embodiment of a third logic diagram.

FIG. 3B illustrates one embodiment of a logic diagram 310. The logic diagram 310 may provide an exemplary implementation for resuming scanning operations for the radio module 106. As shown in FIG. 3B, the logic diagram 310 may determine whether motion has been detected at diamond 312. This may be accomplished using the motion detector 108. If motion is not detected at diamond 312, then the logic diagram 310 ends. If motion is detected at diamond 312, however, the logic diagram 310 commands the radio module 106 to resume scanning operations at block 314.

In addition to controlling scanning operations for the radio module 106 based on motion detection by the motion detector 108, other elements of the mobile computing device 110 may be controlled based on such movement. Additional logic may be implemented to switch other elements of the mobile computing device 110 between various power modes based on when the mobile computing device 110 is moving or stationary. For example, the mobile computing device 110 may reduce or suspend GPS operations when the mobile computing device 110 is stationary. In another example, the mobile computing device 110 may reduce or suspend power to the entire radio module 106 when the mobile computing device 110 is stationary. In yet another example, the mobile computing device 110 may reduce or suspend power to the entire mobile computing device 110 (e.g., application processor, radio processor, and appropriate interfaces) when the mobile computing device 110 is stationary. The embodiments are not limited in this context.

Figure 4:
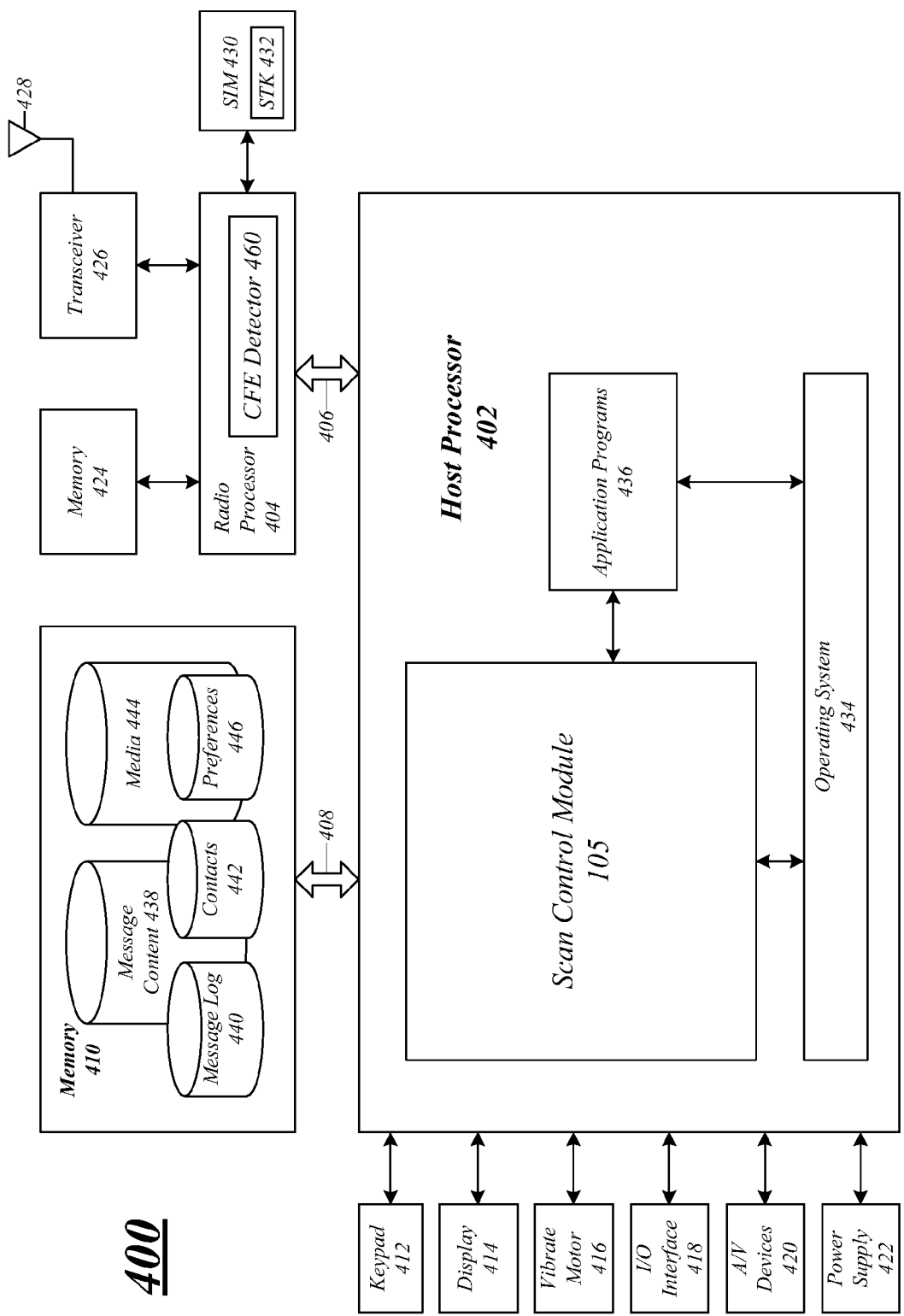
FIG. 4 illustrates one embodiment of a mobile computing device.

FIG. 4 illustrates a block diagram of a mobile computing device 400 suitable for implementing various embodiments, including the mobile computing device 100. It may be appreciated that the mobile computing device 400 is only one example of a suitable mobile computing environment and is not intended to suggest any limitation as to the scope of use or functionality of the embodiments. Neither should the mobile computing device 400 be interpreted as having any dependency or requirement relating to any one or combination of components illustrated in the exemplary mobile computing device 400.

The host processor 402 (e.g., similar to the processor 102) may be responsible for executing various software programs such as system programs and applications programs to provide computing and processing operations for the mobile computing device 400. The radio processor 404 (e.g., similar to the radio processor 124) may be responsible for performing various voice and data communications operations for the mobile computing device 400 such as transmitting and receiving voice and data information over one or more wireless communications channels. Although the mobile computing device 400 is shown with a dual-processor architecture, it may be appreciated that the mobile computing device 400 may use any suitable processor architecture and/or any suitable number of processors in accordance with the described embodiments. In one embodiment, for example, the processors 402, 404 may be implemented using a single integrated processor.

The host processor 402 may be implemented as a host central processing unit (CPU) using any suitable processor or logic device, such as a as a general purpose processor. The host processor 402 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 402 may be coupled through a memory bus 408 to a memory 410. The memory bus 408 may comprise any suitable interface and/or bus architecture for allowing the host processor 402 to access the memory 410. Although the memory 410 may be shown as being separate from the host processor 402 for purposes of illustration, it is worthy to note that in various embodiments some portion or the entire memory 410 may be included on the same integrated circuit as the host processor 402. Alternatively, some portion or the entire memory 410 may be disposed on an integrated circuit or other medium (e.g., hard disk drive) external to the integrated circuit of the host processor 402. In various embodiments, the mobile computing device 400 may comprise an expansion slot to support a multimedia and/or memory card, for example.

The memory 410 may be implemented using any computer-readable media capable of storing data such as volatile or non-volatile memory, removable or non-removable memory, erasable or non-erasable memory, writeable or rewriteable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 400 may comprise an alpha-numeric keypad 412 coupled to the host processor 402. The keypad 412 may comprise, for example, a QWERTY key layout and an integrated number dial pad. The mobile computing device 400 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 412 may comprise a physical keypad using hard buttons, or a virtual keypad using soft buttons displayed on a display 414.

The mobile computing device 400 may comprise a display 414 coupled to the host processor 402. The display 414 may comprise any suitable visual interface for displaying content to a user of the mobile computing device 400. In one embodiment, for example, the display 414 may be implemented by a liquid crystal display (LCD) such as a touch-sensitive color (e.g., 46-bit color) thin-film transistor (TFT) LCD screen. The touch-sensitive LCD may be used with a stylus and/or a handwriting recognizer program.

The mobile computing device 400 may comprise a vibrate motor 416 coupled to the host processor 402. The vibrate motor 416 may be enable or disabled according to the preferences of the user of the mobile computing device 400. When enabled, the vibrate motor 416 may cause the mobile computing device 400 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 400 may comprise an input/output (I/O) interface 418 coupled to the host processor 402. The I/O interface 418 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 400 may be arranged to synchronize information with a local computer system.

The host processor 402 may be coupled to various audio/video (A/V) devices 420 that support A/V capability of the mobile computing device 400. Examples of A/V devices 420 may include, for example, a microphone, one or more speakers, an audio port to connect an audio headset, an audio coder/decoder (codec), an audio player, a Musical Instrument Digital Interface (MIDI) device, a digital camera, a video camera, a video codec, a video player, and so forth.

The host processor 402 may be coupled to a power supply 422 arranged to supply and manage power to the elements of the mobile computing device 400. In various embodiments, the power supply 422 may be implemented by a rechargeable battery, such as a removable and rechargeable lithium ion battery to provide direct current (DC) power, and/or an alternating current (AC) adapter to draw power from a standard AC main power supply.

The radio processor 404 may be arranged to communicate voice information and/or data information over one or more assigned frequency bands of a wireless communication channel. The radio processor 404 may be implemented as a communications processor using any suitable processor or logic device, such as a modem processor or baseband processor. The radio processor 404 may also be implemented as a digital signal processor (DSP), media access control (MAC) processor, or any other type of communications processor in accordance with the described embodiments. The radio processor 404 may perform analog and/or digital baseband operations for the mobile computing device 400. For example, the radio processor 404 may perform digital-to-analog conversion (DAC), analog-to-digital conversion (ADC), modulation, demodulation, encoding, decoding, encryption, decryption, and so forth. The radio processor 404 may include a detector 460. The detector 460 may the same or similar to the detector 126 described with reference to FIG. 1.

The mobile computing device 400 may comprise a memory 424 coupled to the radio processor 404. The memory 424 may be implemented using any of the computer-readable media described with reference to the memory 410. The memory 424 may be typically implemented as flash memory and secure digital (SD) RAM. Although the memory 424 may be shown as being separate from the radio processor 404, some or all of the memory 424 may be included on the same IC as the radio processor 404.

The mobile computing device 400 may comprise a transceiver module 426 coupled to the radio processor 404. The transceiver module 426 may comprise one or more transceivers arranged to communicate using different types of protocols, communication ranges, operating power requirements, RF sub-bands, information types (e.g., voice or data), use scenarios, applications, and so forth. In various embodiments, the transceiver module 426 may comprise one or more transceivers arranged to support voice communications and/or data communications for the wireless network systems or protocols as previously described. In some embodiments, the transceiver module 426 may further comprise a Global Positioning System (GPS) transceiver to support position determination and/or location-based services.

The transceiver module 426 generally may be implemented using one or more chips as desired for a given implementation. Although the transceiver module 426 may be shown as being separate from and external to the radio processor 404 for purposes of illustration, it is worthy to note that in various embodiments some portion or the entire transceiver module 426 may be included on the same integrated circuit as the radio processor 404. The embodiments are not limited in this context.

The mobile computing device 400 may comprise an antenna system 428 for transmitting and/or receiving electrical signals. As shown, the antenna system 428 may be coupled to the radio processor 404 through the transceiver module 426. The antenna system 428 may comprise or be implemented as one or more internal antennas and/or external antennas.

The mobile computing device 400 may comprise a subscriber identity module (SIM) 430 coupled to the radio processor 404. The SIM 430 may comprise, for example, a removable or non-removable smart card arranged to encrypt voice and data transmissions and to store user-specific data for allowing a voice or data communications network to identify and authenticate the user. The SIM 430 also may store data such as personal settings specific to the user. In some embodiments, the SIM 430 may be implemented as an UMTS universal SIM (USIM) card or a CDMA removable user identity module (RUIM) card. The SIM 430 may comprise a SIM application toolkit (STK) 432 comprising a set of programmed commands for enabling the SIM 430 to perform various functions. In some cases, the STK 432 may be arranged to enable the SIM 430 to independently control various aspects of the mobile computing device 400.

As mentioned above, the host processor 402 may be arranged to provide processing or computing resources to the mobile computing device 400. For example, the host processor 402 may be responsible for executing various software programs including system programs such as operating system (OS) 434 and application programs 436. The OS 434 and the application programs 436 may be the same or similar to the application module 114 described with reference to FIG. 1. System programs generally may assist in the running of the mobile computing device 400 and may be directly responsible for controlling, integrating, and managing the individual hardware components of the computer system. The OS 434 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Runtime Environment for Wireless (BREW) OS, JavaOS, a Wireless Application Protocol (WAP) OS, or other suitable OS in accordance with the described embodiments. The mobile computing device 400 may comprise other system programs such as device drivers, programming tools, utility programs, software libraries, application programming interfaces (APIs), and so forth.

Application programs 436 generally may allow a user to accomplish one or more specific tasks. In various implementations, the application programs 436 may provide one or more graphical user interfaces (GUIs) to communicate information between the mobile computing device 400 and a user. In some embodiments, application programs 436 may comprise upper layer programs running on top of the OS 434 of the host processor 402 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 436 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 400 may implement other types of applications in accordance with the described embodiments.

The host processor 402 may include a scan control module 450. The scan control module 450 may the same or similar to the scan control module 105 described with reference to FIG. 1. The radio processor 404 may include a CFE detector 460. The CFE detector 460 may be the same or similar to the CFE detector 107 described with reference to FIG. 1.

The mobile computing device 400 may include various databases implemented in the memory 410. For example, the mobile computing device 400 may include a message content database 438, a message log database 440, a contacts database 442, a media database 444, a preferences database 446, and so forth. The message content database 438 may be arranged to store content and attachments (e.g., media objects) for various types of messages sent and received by one or more messaging applications. The message log 440 may be arranged to track various types of messages which are sent and received by one or more messaging applications. The contacts database 442 may be arranged to store contact records for individuals or entities specified by the user of the mobile computing device 400. The media database 444 may be arranged to store various types of media content such as image information, audio information, video information, and/or other data. The preferences database 446 may be arranged to store various settings such as rules and parameters for controlling the operation of the mobile computing device 400.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
a radio module having a communications failure event detector to detect a communications failure event;
a motion detector to detect motion; and
a processor coupled with the radio module and the motion detector, the processor to execute a scan control module to:
determine the mobile computing device is moving or stationary, and control scanning operations by the radio module in accordance with the determination, the control including reducing or suspending scanning operations when the radio module detects a communications failure event and the device is determined to be stationary,
determine the mobile computing device is stationary for a first time period and reducing scanning operations, and
determine the mobile computing device is stationary for a second time period, subsequent the first period of time, and suspending scanning operations.

2. The mobile computing device of claim 1, the communications failure event comprising at least one of a received signal strength indication failure event, a timeout event, an acquisition failure event, and a decoding error event.

3. The mobile computing device of claim 1, the scan control module to determine the mobile computing device is stationary for the first time period, and reduce a scan rate used by the radio module for the scanning operations.

4. The mobile computing device of claim 1, the scan control module to determine the mobile computing device is stationary for the first time period, and reduce a scan rate used by the radio module for the scanning operations to reduce power consumption from a power supply for the mobile computing device.

5. The mobile computing device of claim 1, the scan control module to determine the mobile computing device is stationary for the second time period, and suspend scanning operations by the radio module while the mobile computing device remains stationary.

6. The mobile computing device of claim 1, the scan control module to determine the mobile computing device is stationary for the second time period, and suspend scanning operations by the radio module to reduce power consumption from a power supply for the mobile computing device.

7. The mobile computing device of claim 1, the scan control module to send a control directive to the radio module to resume scanning for radio signals when the mobile computing device is moving.

8. The mobile computing device of claim 1, the scan control module to send a control directive to the radio module to resume scanning for radio signals when the mobile computing device is moving at a measured speed above a threshold value speed.

9. The mobile computing device of claim 1, the motion detector comprising at least one of an accelerometer, a gyroscope, a global positioning system, a network enhanced global positioning system, a base station proximity system, a triangulation system, a time difference system, a camera and a proximity sensor.

10. A method, comprising:
detecting a communications failure event;
determining a mobile computing device is moving or stationary;
controlling scanning operations for radio signals by a radio module in accordance with the determination, the controlling including reducing or suspending scanning operations when the mobile computing device is determined to be stationary;
determining the mobile computing device is stationary for a first time period;
reducing scanning operations when the mobile computing device is stationary for the first time period;
determining the mobile computing device is stationary for a second time period, subsequent the first time period; and
suspending scanning operations when the mobile computing device is stationary for the second time period.

11. The method of claim 10, comprising
reducing a scan rate used by the radio module for the scanning operations when the mobile computing device is stationary for the first time period.

12. The method of claim 10, comprising scanning for radio signals when the mobile computing device is moving.

13. The method of claim 10, comprising scanning for radio signals when the mobile computing device is moving at a measured speed above a threshold value speed.

14. An article comprising a computer-readable storage medium containing instructions that, when executed by a processor, enable a system to:
- detect a communications failure event;
- determine a mobile computing device is moving or stationary; and
- control scanning operations for radio signals by a radio module in accordance with the determination, the control including reducing or suspending scanning operations when the radio module detects a communications failure event and the mobile computing device is determined to be stationary
- determine the mobile computing device is stationary for a first time period;
- reduce scanning operations when the mobile computing device is stationary for the first time period;
- determine the mobile computing device is stationary for a second time period, subsequent the first time period; and
- suspend scanning operations when the mobile computing device is stationary for the second time period.

15. The article of claim 14, further comprising instructions to
- reduce a scan rate used by the radio module for the scanning operations when the mobile computing device is stationary for the first time period.

16. The article of claim 14, further comprising instructions to scan for radio signals when the mobile computing device is moving.

17. The article of claim 14, further comprising instructions to scan for radio signals when the mobile computing device is moving at a measured velocity above a threshold value velocity.

* * * * *